P. J. AND W. O. MARKS.
PHOTOGRAPHIC VIEW FINDER.
APPLICATION FILED DEC. 12, 1921.

1,423,809.

Patented July 25, 1922.
2 SHEETS—SHEET 1.

INVENTORS
Paul J. Marks
Walter O. Marks
BY Nelson T. Hallauer
Their ATTORNEY

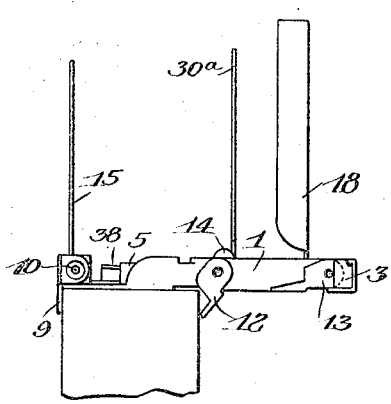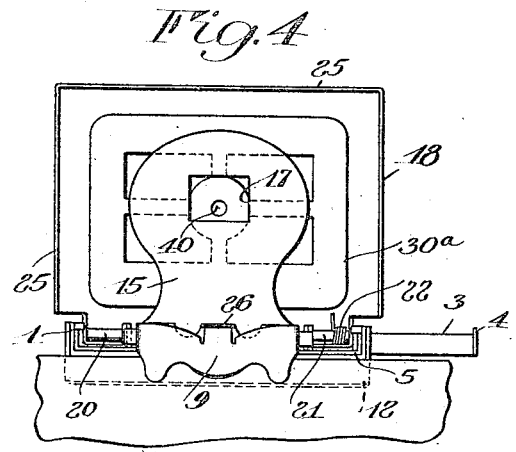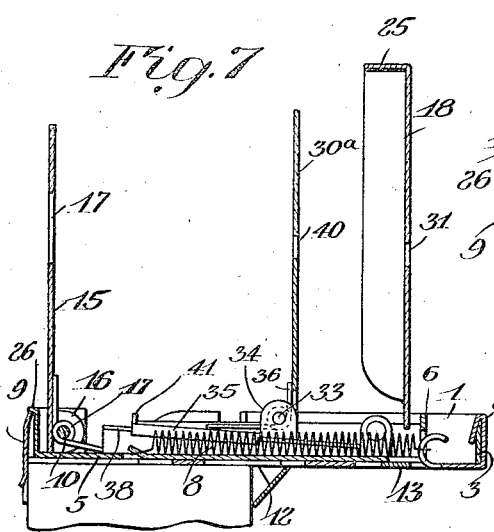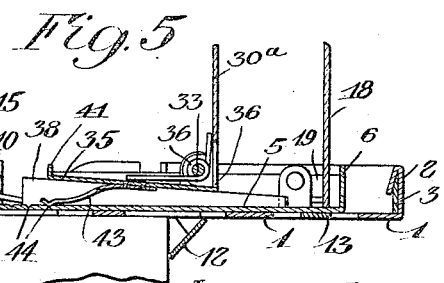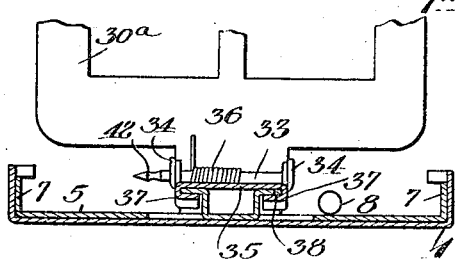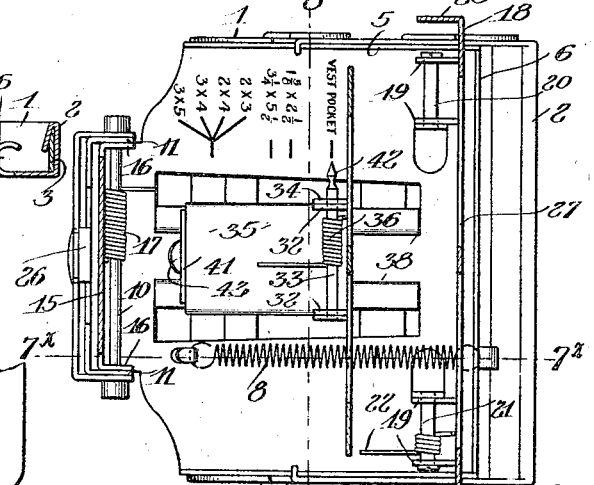

UNITED STATES PATENT OFFICE.

PAUL J. MARKS AND WALTER O. MARKS, OF ROCHESTER, NEW YORK.

PHOTOGRAPHIC-VIEW FINDER.

1,423,809.      Specification of Letters Patent.      Patented July 25, 1922.

Application filed December 12, 1921. Serial No. 521,633.

*To all whom it may concern:*

Be it known that we, PAUL J. MARKS and WALTER O. MARKS, citizens of the United States, residing at Rochester, in the county of Monroe and State of New York, have invented certain new and useful Improvements in Photographic-View Finders; and we do declare the following to be a full, clear, and exact description of the same, taken in connection with the accompanying drawings, forming a part of this specification.

Our invention relates to photographic view finders, of the kind adapted to be conveniently attached to a camera and which are adapted to afford a direct view of the image appearing on the ground glass or film. The principal object of our invention is to provide a finder of this kind which is adjustable for use on cameras using different sizes of plates or films. A further object of our invention is to provide a finder of this kind provided with a plurality of field defining frames having cross bars and central perforations adapted to define the optical centre of the field. Another object of our invention is to provide a finder of this kind in which one of a plurality of field defining frames is adjustable in a plane parallel with the optical axis of the finder. A still further object of our invention is to provide a finder of this kind which may be readily attached to pocket cameras of the types now generally in use and in which the parts may be readily folded upon each other forming a compact packet which may be readily carried in a pocket. To these and other ends our invention resides in certain combinations and arrangement of parts hereinafter more fully described and particularly pointed out in the claims at the end of this specification.

In the drawings:

Fig. 3, is a side elevation showing the finder attached to a small camera, Fig. 4, is a rear elevation of the same.

Fig. 5, is a central longitudinal section of the same, parts being broken away.

Fig. 6, is a plan view, parts being sectioned away to expose the underlying parts.

Fig. 7, is a longitudinal section on line $7^x$—$7^x$ Fig. 6, and showing the sighting devices in position thereon, and Fig. 8, is a transverse section on the line $8^x$—$8^x$ of Fig. 6.

Figure 1:
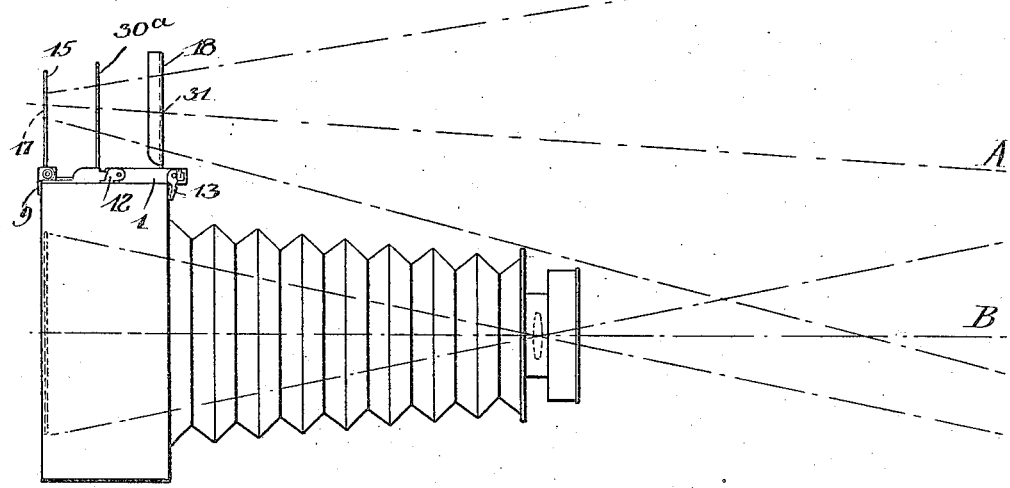
Fig. 1 is a side elevation of a camera showing one embodiment of our invention in position thereon.
Figure 2:
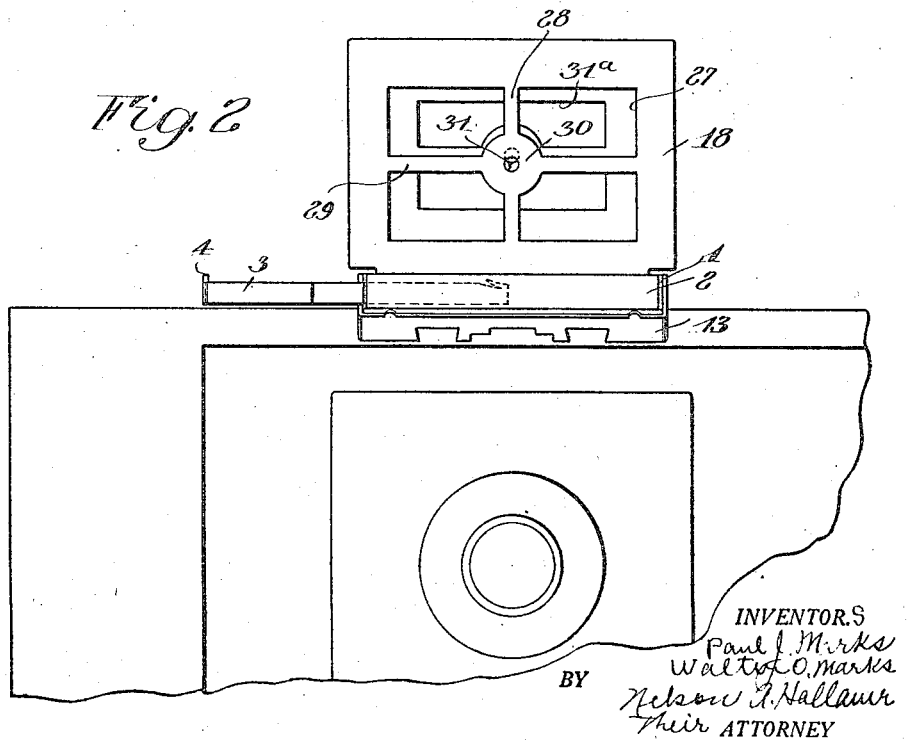
Fig. 2 is a front elevation of the same, somewhat enlarged.

Our improved finder comprises a base member 1 substantially rectangular in form bent up at its forward and side edges to form flanges. The forward flange of the member 1 may be turned over to form a tubular member in which is slidably mounted a gauge 3 having a fingerpiece 4 by means of which it may be extended. The gauge frictionally engages the inner wall of the tubular member and serves to locate the finder centrally of the camera to which it is attached. If desired, the gauge 3 may be provided with a scale graduated to show the extent to which it must be extended when the finder is attached to cameras of different sizes. In attaching the finder to a camera, the gauge is withdrawn to the proper extent determined by the size of the camera and indicated by the scale. When the outer end of the gauge is now placed in the plane of the outer edge of the camera, the optical center of the finder is in proper position directly over the optical axis of the lens of the camera.

Guided between the lateral flanges of the base member 1 is a slidable member in the form of a substantially rectangular plate 5, having a flange 6 at its forward end and substantially parallel lateral flanges 7 closely adjacent the lateral flanges of the member 1. The plate 5 is normally held in its forward position by means of a coiled spring 8 secured to the plate adjacent its rear end and anchored to the plate 1 adjacent its forward end. Pivotally mounted on the rear end of the plate 5 is a clamping member constructed of sheet material and movable from a position adjacent the wall of the plate to a downwardly projecting position, at substantially right angles thereto. The clamping member 9 has a pair of perforated ears by means of which it is pivotally mounted on the rod or pin 10 fixed in a pair of ears 11 bent up on the rear end of the plate 5. Between the ears 11 the plate 5 has an upturned flange which serves as a stop to prevent the clamping member 9 from moving past a position substantially perpendicular to the plane of the plate. The clamping member 9 is adapted to cooperate with a clamping member 12 pivotally mounted on the base member 1. The member 12 is constructed of sheet material and has a pair of upturned ears 14 at its ends adapted to fit over the lateral flanges of the plate 1 to which it is pivoted. Normally when not in use the member 12 lies closely adjacent the bottom wall of the plate 1, but when it is desired to clamp the finder to a camera, it is moved on its pivots until it engages the bottom wall of the plate 1 when it is in an extended position as shown in Fig. 3. When it is desired to clamp the finder to a camera the clamping members 9 and 12 are extended and then pulled apart against the tension of the tension of the spring 8 which when retracted clamps the finder to the frame of the camera as clearly shown in the drawings. If it is desired to use the finder on a camera of larger size, such that the distance between the members 9 and 12 when separated to their fullest extent is not sufficient to engage the edges of the camera frame, a second clamping member 13 may be provided similar in all respects to the member 12 but pivoted to the plate 1 nearer its forward edge and at a greater distance from the cooperating member 9.

Mounted on the plate 5 at its rear end is a sighting member or eyepiece 15, constructed of sheet material and having a pair of perforated ears 16 by means of which it is pivotally mounted on the pin 10. When not in use the member 15 occupies a position adjacent to and substantially parallel with the plate 5 but is movable on its pivot to a position substantially perpendicular to said plate. A spring 17 coiled about the pivot 10 engages the member 15 and is anchored against the member 5 and serves to resiliently hold the member 15 in erect position in which it is maintained against the action of its spring by engagement with the flange at the rear end of the plate 5. The member 15 may be of any preferred form and is provided with a central sighting opening 17. Pivotally mounted on the rear end of the plate 5 is a second sighting member 18 also constructed of sheet material. Adjacent each side of the plate 5 is a pair of upturned ears 19 in which pins or pivots 20 and 21 are mounted. The member 18 is provided with ears rotatably mounted on the pins 20 and 21 and a spring 22 is coiled about the pivot 21 and is anchored against the plate 5 and engages the member 18 to swing it to a position at substantially right angles to the plate 5. The engagement of the member 18 with the plate 5 serves as a stop to prevent movement thereof beyond a position in which it is substantially parallel with the plane of the member 15. The member 18 has an inwardly extending flange 25 along its upper and side edges which serves to enclose the member 15 and other parts mounted on the plate 5 when the member 18 is folded down against the action of its spring 22. A slight projection 26 may be provided on the flange on the rear end of the plate 5, to frictionally engage the flange 25 to hold the device in closed position.

The material of the member 18 is cut away centrally to form a substantially rectangular opening 27 divided into four substantially equal parts by the intersecting cross bars 28 and 29. At the meeting point of the bars 28 and 29, a circular portion 30 may be provided for strengthening purposes, having the central sighting opening 31 formed therein. It will be noted by reference to the various figures of the drawings, that the optical axis through the opening in the member 15 and the opening 31 indicated by the line $a$ in Fig. 1 is inclined forwardly and downwardly with respect to the optical axis of the camera indicated by the line B. By means of this arrangement, the optical axis of the finder locates the centre of the view appearing on the film or ground glass of the camera and its outlines are clearly defined by the outline of the opening 27. A finder constructed as above defined is compact to carry in the pocket, and can be quickly attached to the camera. Such a device, however, is adapted for use with cameras of only one size having a lens of fixed focal length determined by the size of the opening 27.

In order to adapt our finder for use with cameras of different sizes or those using lenses of different angles, a sighting member $30^a$ is mounted on the member 5 between the members 15 and 18 and adjustable relatively thereto in a plane parallel to the optical axis of the finder. The member $30^a$ is similar to the member 18 except that it has no flange 25 and its central rectangular opening $31^a$ is somewhat smaller than the opening 27. The member $30^a$ is provided with a pair of ears 32 by means of which it is pivotally mounted on a pin or rod 33 fixed in the upturned ears 34 of a plate 35 on which the member is mounted. A spring 36 coiled about the pin 33 is anchored against the plate 35 and engages the member $30^a$ and normally holds the same in a plane parallel with the plane of the member 15. The engagement of a projection 36 on the member $30^a$ with the forward end of the plate 35 serves as a stop to limit the action of the spring. The plate 35 has downwardly and inwardly turned flanges 37 adapted to cooperate with a downwardly and forwardly inclined slideway 38 on which it is slidably mounted for adjustment to and from the member 18. The inclination of the guideway 38 is such that the plane of adjustment of the member $30^a$ is substantially parallel with the optical axis of the finder which is through the openings 17 and 31 and a central opening 40 in the member 30ª. For use with small cameras or narrow angle lenses the member 30ª is located near the member 18 in which position a field is defined smaller than that defined by the member 18. This field may be enlarged as desired by adjusting the member 30ª away from the member 18 until the field of view through the opening 27 is defined within the view seen through the opening 30.

In order to facilitate the adjustment of the member 30ª, the plate 35 may be provided with the fingerpiece 41 and a pointer 42 adapted to cooperate with a fixed scale on the member 5 indicating the position of adjustment of the member 40 for cameras using plates or films of different sizes. A resilient clip 43 beneath the plate 35 and secured thereto is adapted to snap into one of a plurality of depressions 44 in the plate 5, to resiliently maintain the plate in adjusted position.

Having described our invention what we claim and desire to secure by Letters Patent is:

1. In a finder, the combination of a base member, a clamping member thereon, a supporting member slidably mounted on said base member, a plurality of sighting devices supported thereon, a clamping member on said supporting member, and resilient means for moving said clamping members into engagement with a camera.

2. In a finder, the combination of a base member, a clamping member collapsible thereon, a supporting member slidably mounted on said base member, sighting devices supported thereon, a clamping member collapsible thereon and adapted to cooperate with the first mentioned clamping member, and a spring for controlling the action of said clamping members.

3. In a finder, the combination of a base member, a plurality of clamping members mounted thereon, a supporting member slidably mounted on said base member, sighting devices thereon, a clamping member on said supporting member adapted to cooperate with one or another of said first mentioned clamping members, and means for controlling the action of said clamping members.

4. In a finder, the combination of a base member, sighting devices mounted thereon, and a slidable gauge adapted to locate the finder on a camera with its optical axis in the plane of the optical axis of the camera.

5. In a finder, the combination of a base member, a supporting member thereon, front and rear sighting devices mounted thereon, and a third sighting device intermediate said first mentioned sighting devices.

6. In a finder, the combination of a base member, a supporting member thereon, front and rear sighting devices mounted on said supporting member, and a third sighting device mounted on said member for adjustment to and from the rear sighting device.

7. In a finder, the combination of a supporting member, front and rear sighting devices mounted thereon, and arranged to define an optical axis inclined with respect to the plane of the supporting member, and a third sighting device mounted on said supporting member and adjustable in a plane substantially parallel with said optical axis.

8. In a finder, the combination of a supporting member, front and rear sighting devices mounted thereon, and arranged to define an optical axis inclined with respect to the plane of the supporting member, a third sighting device adjustable on said supporting member in a plane substantially parallel with said optical axis, and a scale and cooperating pointer for indicating the position of adjustment of said sighting device.

9. In a finder, the combination of a supporting member, front and rear sighting devices mounted thereon, and arranged to define an optical axis inclined with respect to the plane of the supporting member, a guideway on said member intermediate said sighting devices, and arranged in a plane substantially parallel with said optical axis, and a third sighting device adjustable on said guideway.

10. In a finder, the combination of a supporting member, front and rear sighting devices mounted thereon, and arranged to define an optical axis inclined with respect to the plane of the supporting member, a guideway on said members, a third sighting device adjustable on said guideway, and resilient means for retaining said device in adjustable position.

11. In a finder, the combination of a supporting member, front and rear sighting devices mounted thereon, and arranged to define an optical axis inclined with respect to the plane of the supporting member, a guideway on said member, a plate adjustable on said guideway, and a third sighting device collapsible on said plate.

12. In a finder, the combination of a supporting member, a rear sighting device mounted thereon and having a sight opening and a front sighting device also mounted thereon and having an opening adapted to define the substantial outlines of a view, and a small central opening adapted to locate the optical center of the view seen through the opening in the rear sighting device.

13. In a finder, the combination of a supporting member, a rear sighting device mounted thereon, having a sight opening, a front sighting device also mounted thereon and having an opening adapted to define the substantial outlines of a view seen through the opening in the rear sighting device, and a third sighting device mounted on the supporting member and also having a sight opening, said third sighting device being movable from a position to define a different view from that defined by the front sighting device to an inoperative position.

14. In a finder, the combination of a supporting member, a rear sighting device mounted thereon, having a sight opening, a front sighting device also mounted thereon and having an opening adapted to define the substantial outlines of a view seen through the opening in the rear sighting device, a third sighting device mounted on the supporting member and also having a sight opening, said third sighting device being adjustable to define a series of views different from that defined by the front sighting device and means for retaining said third sighting device in adjustable position.

15. In a finder, the combination of a supporting member, a rear sighting device mounted thereon having a sight opening, a front sighting device and having an opening adapted to define the substantial outlines of a view seen through the rear sighting device, and a small central opening adapted to define the optical axis of the view, a third sighting device mounted on the supporting member having a small opening in the line of the optical axis and an opening adapted to define a view different from that defined by the front sighting device, and means for adjusting the third sighting device along the line of the optical axis.

16. In a finder, the combination of a supporting member, front and rear sighting devices mounted thereon, and means adapted to clamp the finder to the frame of a camera, with the rear sighting device positioned in substantially the same plane as the film, or ground glass, of the camera.

PAUL J. MARKS.
WALTER O. MARKS.